United States Patent Office 3,453,913
Patented July 8, 1969

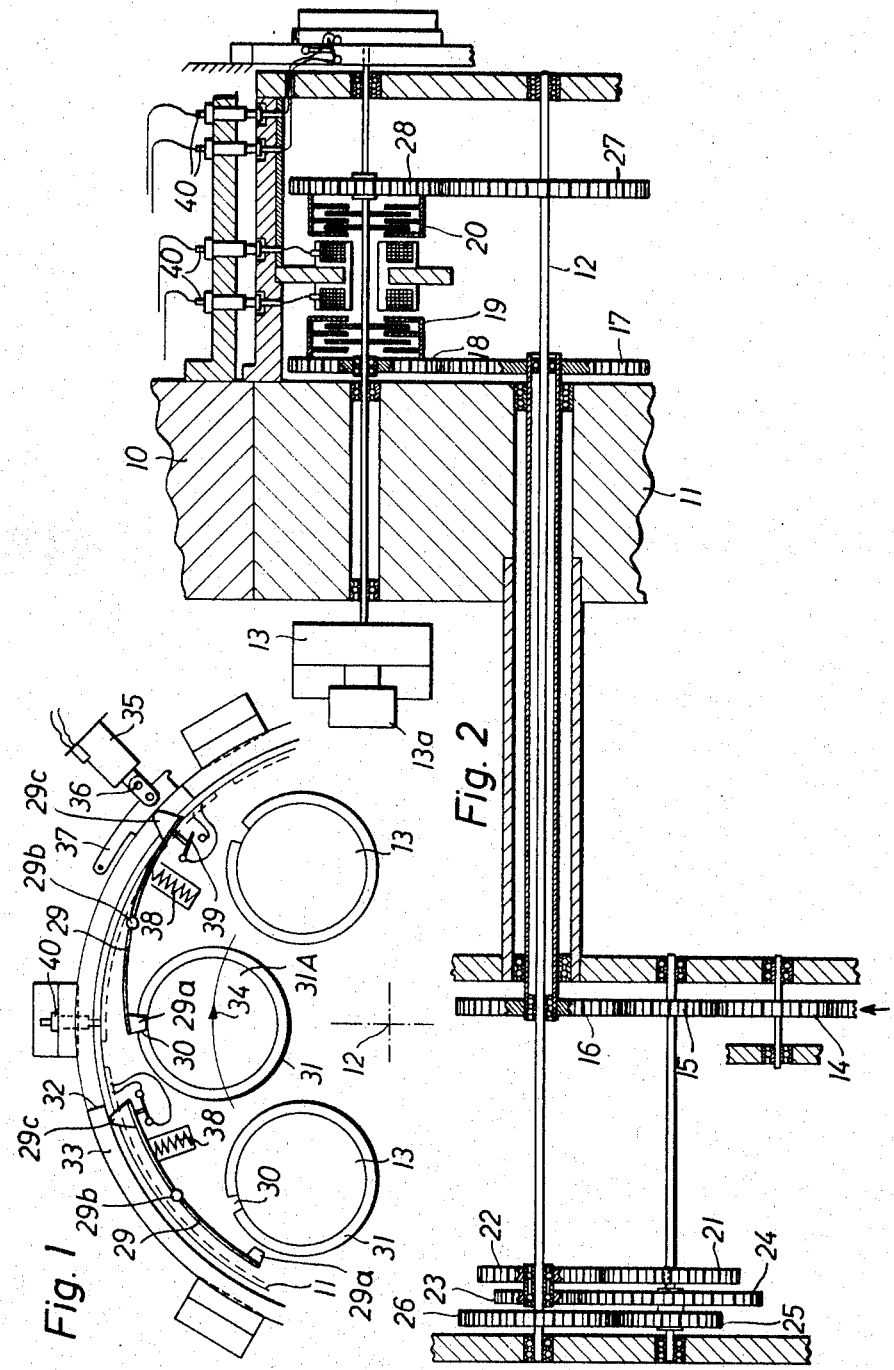

3,453,913
MACHINE TOOL
Willi Sylla, Cologne-Hohenhaus, Germany, assignor to Alfred H. Schutte, Cologne-Deutz, Germany
Filed Nov. 3, 1966, Ser. No. 591,865
Claims priority, application Germany, Nov. 9, 1965, Sch 37,992
Int. Cl. B23b 19/02, 3/34
U.S. Cl. 82—28                          10 Claims

ABSTRACT OF THE DISCLOSURE

A multiple spindle machine tool wherein an indexible carrier and the spindles which are rotatable therein carry cooperating locking members one of which is caused to engage the other locking member by an actuating device mounted on a stationary support of the machine in response to indexing of the carrier to a predetermined angular position whereby that spindle whose locking member engages with the corresponding locking member on the carrier comes to a halt in a predetermined angular position.

---

The present invention relates to machine tools in general, and more particularly to improvements in multiple spindle automatics. Still more particularly, the invention relates to improvements in an arrangement which may be utilized in multiple spindle automatics to hold successive work spindles against rotation with reference to their carrier when the latter is indexed to at least one predetermined angular position.

It is well known to install a series of equidistant parallel work spindles in a rotary drum-shaped carrier which is indexible in the frame of a multiple spindle automatic and can be arrested in a series of predetermined angular positions whereby the workpieces which are carried by the spindles are in an optimum position to be treated by one or more tools while the carrier dwells in one or more of its predetermined angular positions. In certain machining operations, the workpieces must be held against rotation and at a certain angle during engagement with the tools, and such immobilization of spindles in one or more predetermined angular positions of their carrier is normally effected by an arresting or locking arrangement which becomes effective after the carrier comes to a full stop following its indexing to a new angular position. This consumes considerable time to that the period allotted for actual treatment of workpieces is reduced or the dwell of the carrier in each of its successive angular positions must be made longer at the expense of the overall output of the machine tool. As a rule, presently known multiple spindle automatics are provided with variable-speed drive means for the spindles and such drive means is arranged to rotate the spindles at a reduced speed in response to halting of their carrier. A locking member is then caused to snap into a recess provided in each spindle when the respective spindle reaches a predetermined treating station. The locking member is mounted on the frame and its engagement with the spindle follows the completion of an indexing step. In other words, the indexing step is completed prior to placing of a given work spindle into a predetermined angular position with reference to its own axis.

Accordingly, it is an important object of the present invention to provide a novel and improved arresting arrangement which is capable of arresting the spindles of a multiple spindle machine tool not later than at the time the spindle carrier completes an indexing step so that the entire period of dwell of the carrier between two successive indexing operations can be used for actual treatment of a workpiece which is held by the thus arrested spindle.

Another object of the invention is to provide an arresting arrangement of the just outlined character which can be rendered inactive so that, if necessary, the operator can cause a selected spindle to rotate even after such selected spindle has been indexed with the carrier to a position in which it normally remains stationary.

A further object of the invention is to provide an arresting arrangement whose operation is fully automatic and which can hold selected spindles against rotation by positive mechanical locking action.

An additional object of my invention is to provide an arresting arrangement which can be readily incorporated in presently known multiple spindle automatic machine tools without necessitatng substantial alterations in the operation and/or design of such tools.

A concomitant object of the invention is to provide a novel locking structure which can be utilized in the improved arresting arrangement.

Another object of the invention is to provide an arresting arrangement which is operated in automatic response to indexing of the spindle carrier so that the indexing mechanism can perform an additional important function without adding to the bulk or complicatedness of the machine tool.

Briefly stated, one feature of my invention resides in the provision of a machine tool, for example, a multiple spindle automatic chucking or bar machine, comprising a frame or an analogous main support, a drum or an analogous carrier indexible in the frame about a predetermined axis to and from at least one predetermined angular position, at least one spindle rotatably mounted in and indexible with the carrier, drive means for rotating the spindle with reference to the carrier, and novel arresting means for holding the spindle against rotation in at least one preselected angular position whenever the carrier assumes its predetermined angular position. The arresting means comprises first and second locking portions respectively provided on the spindle and on the carrier, one of the locking portions being movable to and from engagement with the other locking portion to thereby hold the spindle in preselected angular position, and actuating means for effecting movement of the one locking portion into engagement with the other locking portion in response to indexing of the carrier to predetermined position so that the spindle is held in preselected angular position when the carrier reaches such predetermined position whereby the entire interval during which the carrier dwells in its predetermined position can be used to treat a workpiece which is held by the spindle.

In accordance with a presently preferred embodiment of my invention, the one locking portion is constituted by the second locking portion and may comprise a lever which is turnable on the carrier and has a projection extendable into a recess provided on the other locking portion which is rotatable with the spindle. The actuating means may comprise a spring or analogous resilient means for biasing the projection of the lever into the recess in response to indexing of the carrier beyond its predetermined position so that the spindle can be rotated by its drive means.

The novel features which are considered as characteristic of the invention are set forth in particular in the appended claims. The improved machine tool itself, however, both as to its construction and its mode of operation, together with additional features and advantages thereof, will be best understood upon perusal of the following detailed description of a specific embodiment with reference to the accompanying drawings, in which:

FIG. 1 is a fragmentary end elevational view of an indexible carrier which is installed in the frame of a multiple spindle automatic machine tool embodying the present invention; and FIG. 2 is a fragmentary axial section through the carrier, further showing the drive means for the work spindles.

Referring to the drawings in detail, there is shown a multiple spindle machine tool including a main support or frame 10 for a carrier 11 here shown as a cylinder or drum which is indexible about a horizontal axis 12. The indexing mechanism is of known design and has not been shown in the drawings. The carrier 11 supports a series of parallel equidistant work spindles 13 which are rotatable about their own axes and can be rotated by a drive including a train of diagrammatically illustrated gears 14, 15, 16, 17, 18 and electromagnetic high-speed clutches 19. If a selected spindle 13 is to be arrested in a preselected angular position (with reference to its own axis), it must be braked and thereupon driven at a reduced speed until it actually assumes the desired angular position. This is achieved by disconnecting the respective high-speed clutch 19 and by engaging the associated electromagnetic low-speed clutch 20. Thus, each of the clutches 20 serves first as a brake and thereupon as a component of drive means for rotating the corresponding spindle 13 at a reduced speed. During operation at reduced speed, the spindle is driven by a second gear train including the aforementioned gears 14, 15 and additional gears 21, 22, 23, 24, 25, 26, 27, 28, the gear 28 being arranged to transmit torque to the clutch 20. The clutch 20 ceases to drive the respective spindle 13 when the latter reaches its preselected angular position because the spindle is then held against further rotation by a positive mechanical action brought about by an arresting unit which is best shown in FIG. 1. This arresting unit comprises cooperating locking portions 31 and 29 which are respectively provided on the spindles 13 and on the carrier 11, and actuating means for locking portions 29. In the illustrated embodiment, the actuating means comprises a fixed ring-shaped cam 33 which is mounted on the frame 10 adjacent to the path of movement of the locking portions 29 and effects disengagement of successive locking portions 29 from the associated locking portions 31 when the carrier 11 is indexed from a predetermined angular position with reference to the axis 12. The locking portions 31 resemble annuli which are fixed to and rotate with the associated spindles 13, and each of these annuli is provided with at least one recess 30 adapted to receive a projection 29a provided at one end of the associated locking portion 29. The locking portions 29 resemble two-armed levers which are fulcrumed on the carrier 11, as at 29b. One arm of each lever 29 carries the aforementioned projection 29a and the other arm carries a follower 29c which can track the internal face of the cam 34. The aforementioned actuating means preferably further comprises suitable resilient means for permanently biasing the projections 29a into the associated recesses 30. In the embodiment of FIGS. 1 and 2, the resilient means comprises a set of prestressed helical springs 38 mounted on the carrier 11 and arranged to bias the levers 29 in a counterclockwise direction, as viewed in FIG. 1.

The annuli 31 are preferably adjustable with reference to their spindles 13 so that each of the spindles can be arrested in any desired angular position with reference to its own axis. This might become necessary if the operators must change the setup when the machine tool is to be used for treatment of a different batch of workpieces. Such workpieces are held in chucks 13a or analogous work holders attached to the spindles 13 and, once properly engaged, each workpiece is indexed to a series of working stations each of which accommodates one or more stationary and/or movable tools to bring about a series of milling drilling, reaming, tapping, grinding and/or other operations.

The cam 33 is not a circumferentially complete ring, i.e., it is provided with one or more interruptions or gaps 32 which are necessary in order to permit entry of successive projections 29a into the associated recesses 30. When the carrier 11 is indexed again, the followers 29c reengage the cam 33 and tilt the corresponding levers 29 in a clockwise direction, as viewed in FIG. 1, to withdraw the projections 29a from the recesses 30 so that the spindles 13 are free to rotate again. The direction in which the carrier 11 rotates is indicated by arrow 34.

In some instances, the operator might wish to rotate the spindles 13 even at such times when the carrier 11 is indexed to a position (shown in FIG. 1) in which a spindle 13A is held against rotation in a preselected angular position with reference to its own axis. To this end, the machine tool preferably comprises auxiliary actuating means including an electromagnet 35 having a reciprocable armature coupled to a link 36 which is articulately connected with a rocking lever 37. In response to energization of the electromagnet 35, the lever 37 is pivoted in a clockwise direction, as viewed in FIG. 1, and depresses the adjoining follower 29c so that the corresponding lever 29 pivots in a clockwise direction and withdraws its projection 29a from the recess 30 in the annulus 31 of the spindle 13A. This spindle is then free to rotate in response to engagement of the associated clutch 19 or 20. Such rotation of the spindle 13A might be desirable in order to carryout a turning or milling operation. The lever 29 for the spindle 13A may be used to operate a control element, here shown as a switch 39 which is connected in the circuit of the clutch 19 or 20 to disengage the clutch in order to terminate high-speed or low-speed rotation of the spindle 13A on energization of the electromagnet 35. For example, the switches 39 may be utilized to open the circuits of low-speed clutches 30 when the respective spindles are indexed from positions corresponding to that of the spindle 13A shown in FIG. 1.

The numeral 40 denotes a series of sliding contacts which are connected in the circuit of the clutches 19 and 20 in certain angular positions of the carrier 11. The manner in which the electrical components on the carrier 11 can be connected with an outside source of electrical energy is well known from the art and the exact construction of the current conducting elements forms no part of the present invention.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed as new and desired to be protected by Letters Patent is:

1. In a machine tool, particularly a multiple spindle automatic, in combination a support; a carrier indexible in said support about a predetermined axis to at least one predetermined angular position; a spindle rotatably mounted in and indexible with said carrier; drive means for rotating said spindle with reference to said carrier; and arresting means for holding said spindle against rotation in at least one preselected angular position whenever said carrier assumes said one predetermined position, comprising cooperating first and second locking portions respectively provided on said spindle and on said carrier so that each of said locking portions shares indexing movements of said carrier, one of said locking portions being movable to and from engagement with the other locking portion to thereby hold said spindle in said one preselected position, and actuating means provided on said support for effecting movement of said one locking portion into engagement with said other locking portion in response to indexing of said carrier to said one predetermined position.

2. In a machine tool, particularly a multiple spindle automatic, in combination a support; a carrier indexible in said support about a predetermined axis to at least one predetermined angular position; a spindle rotatably mounted in and indexible with said carrier; drive means for rotating said spindle with reference to said carrier; and arresting means for holding said spindle against rotation in at least one preselected angular position whenever said carrier assumes said one predetermined position, comprising cooperating first and second locking portions respectively provided on said spindle and on said carrier, said second locking portion being movable to and from engagement with said first locking portion to thereby hold said spindle in said one preselected position, said second locking portion including a two-armed lever turnable on said carrier and having a projection receivable in a recess provided in said first locking portion which latter is rotatable with said spindle, and actuating means for effecting movement of said second locking portion into engagement with said first locking portion in response to indexing of said carrier to said one predetermined position, said actuating means comprising a cam fixed to said support and positioned to expel said projection from said recess in response to indexing of said carrier from said one predetermined position.

3. In a machine tool, particularly a multiple spindle automatic, in combination a support; a carrier indexible in said support about a predetermined axis to at least one predetermined angular position; a spindle rotatably mounted in and indexible with said carrier; drive means for rotating said spindle with reference to said carrier; and arresting means for holding said spindle against rotation in at least one preselected angular position whenever said carrier assumes said one predetermined position, comprising cooperating first and second locking portions respectively provided on said spindle and on said carrier, said second locking portion being movable to and from engagement with said first locking portion to thereby hold said spindle in said one preselected position, said first locking portion being rotatable with said spindle and being provided with a recess and said second locking portion comprising a lever turnably mounted on said carrier and having a projection receivable in said recess, and actuating means for effecting movement of said second locking portion into engagement with said first locking portion in response to indexing of said carrier to said one predetermined position, said actuating means comprising resilient means permanently biasing said lever in a first direction to move said projection into said recess and cam means carried by said support for turning said lever in a second direction against the opposition of said resilient means in response to indexing of said carrier beyond said one predetermined position so that the projection is withdrawn from said recess.

4. A machine tool as defined in claim 1, further comprising auxiliary actuating means for selectively disengaging said locking portions in said one predetermined position of said carrier so that, when necessary, said spindle can be rotated in such one predetermined position of said carrier.

5. A machine tool as defined in claim 4, wherein said auxiliary actuating means comprises an electromagnet having two conditions of energization in one of which said one locking portion is disengaged from said other locking portion.

6. A machine tool as defined in claim 1, wherein said drive means comprises clutch means and further comprising control means responsive to movement of said one locking portion to thereby operate said clutch means.

7. A machine tool as defined in claim 6, wherein said clutch means comprises an electromagnetic clutch and said control means comprises a switch connected in circuit with said electromagnetic clutch and movable between open and closed positions, said one locking portion being arranged to effect movement of said switch to one of said open and closed positions in response to engagement with said other locking portion.

8. A machine tool as defined in claim 1, further comprising a plurality of additional spindles each rotatably mounted in and indexible with said carrier, said drive means being arranged to rotate all of said spindles and said arresting means comprising additional first and second locking portions, one for each of said additional spindles.

9. A machine tool as defined in claim 8, wherein the axes of said spindles are equidistant from and parallel to each other and to said predetermined axis.

10. A machine tool as defined in claim 8, wherein each of said one locking portions is movable into positive mechanical engagement with the respective other locking portion.

References Cited

UNITED STATES PATENTS

| 2,876,527 | 3/1959 | Matlachowsky | 82—28.2 |
| 2,907,434 | 10/1959 | Wenzel | 82—28.2 |
| 3,103,838 | 9/1963 | Beacom et al. | 82—28 |

FOREIGN PATENTS 964,778  7/1964  Great Britain.

LEONIDAS VLACHOS, *Primary Examiner.*

U.S. Cl. X.R.

82—3